United States Patent
Wang et al.

(10) Patent No.: US 12,256,392 B2
(45) Date of Patent: Mar. 18, 2025

(54) EFFICIENT UPLINK RESOURCE REQUESTS IN WLAN SYSTEMS

(71) Applicant: INTERDIGITAL PATENT HOLDINGS, INC., Wilmington, DE (US)

(72) Inventors: Xiaofei Wang, North Caldwell, NJ (US); Hanqing Lou, Syosset, NY (US); Alphan Sahin, Westbury, NY (US); Li-Hsiang Sun, San Diego, CA (US); Joseph S. Levy, Merrick, NY (US); Rui Yang, Greenlawn, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 599 days.

(21) Appl. No.: 17/610,342

(22) PCT Filed: May 1, 2020

(86) PCT No.: PCT/US2020/030993
§ 371 (c)(1),
(2) Date: Nov. 10, 2021

(87) PCT Pub. No.: WO2020/231649
PCT Pub. Date: Nov. 19, 2020

(65) Prior Publication Data
US 2022/0225323 A1    Jul. 14, 2022

Related U.S. Application Data

(60) Provisional application No. 62/846,031, filed on May 10, 2019.

(51) Int. Cl.
*H04W 72/21*    (2023.01)
*H04W 72/543*   (2023.01)
(Continued)

(52) U.S. Cl.
CPC ........ *H04W 72/21* (2023.01); *H04W 72/543* (2023.01); *H04W 72/56* (2023.01);
(Continued)

(58) Field of Classification Search
CPC ... H04W 72/21; H04W 72/543; H04W 72/56; H04W 74/002; H04W 74/06; H04W 84/12
See application file for complete search history.

(56) References Cited

U.S. PATENT DOCUMENTS 8,842,657 B2   9/2014  Walton et al.
9,680,538 B2   6/2017  Xia et al.
(Continued)

FOREIGN PATENT DOCUMENTS

GB    2 558 620       10/2019
WO    2018071105 A1    4/2018
(Continued)

OTHER PUBLICATIONS

Cariou, "802.11 EHT Proposed PAR," IEEE P802.11 Wireless LANs, IEEE 802.11-18/1231r4 (Jan. 2019).
(Continued)

*Primary Examiner* — Basil Ma
(74) *Attorney, Agent, or Firm* — VOLPE KOENIG

(57) ABSTRACT

Techniques, devices and systems are disclosed for generating a resource request poll comprising at least one response criteria, transmitting the resource request poll, receiving a resource request report from STAs that meet at least one response criteria. A trigger frame may be transmitted to the at least one STA based on the resource request report from the at least one STA. The response criteria may include at least one of a NFRP, a UL access type, a delay bound, an NDP feedback report AC, a number of indicated AID bits, an AID range, an information requested, a number of bits to be
(Continued)

included in NDP feedback report or preamble, number of LTFs to be included in the NDP feedback report or preamble, and a number of bits to be included in NDP feedback report or preamble per LTF or per N LTF symbol.

20 Claims, 8 Drawing Sheets

(51) Int. Cl.
    *H04W 72/56*    (2023.01)
    *H04W 74/00*    (2009.01)
    *H04W 74/06*    (2009.01)
    *H04W 84/12*    (2009.01)

(52) U.S. Cl.
    CPC ......... *H04W 74/002* (2013.01); *H04W 74/06* (2013.01); *H04W 84/12* (2013.01)

(56) References Cited

U.S. PATENT DOCUMENTS

| | | | |
|---|---|---|---|
| 10,143,003 | B2 | 11/2018 | Josiam et al. |
| 10,327,204 | B2 | 6/2019 | Park et al. |
| 10,499,425 | B2 | 12/2019 | He et al. |
| 2016/0113034 | A1 | 4/2016 | Seok |
| 2016/0227533 | A1 | 8/2016 | Josiam et al. |
| 2019/0089424 | A1* | 3/2019 | Cariou .................. H04W 74/06 |
| 2021/0368497 | A1* | 11/2021 | Nezou .................. H04L 5/0094 |

FOREIGN PATENT DOCUMENTS

| | | |
|---|---|---|
| WO | 2018144074 A1 | 8/2018 |
| WO | 2019/045776 | 3/2019 |

OTHER PUBLICATIONS

Cariou, "IEEE 802.11 EHT draft Proposed CSD," IEEE P802.11 Wireless LANs, IEEE 802.11-18/1233r4 (Jan. 2019).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D4.1 (Apr. 2019).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D6.0 (Nov. 2019).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

* cited by examiner

EFFICIENT UPLINK RESOURCE REQUESTS IN WLAN SYSTEMS

CROSS-REFERENCE TO RELATED APPLICATIONS

This application is the U.S. National Stage, under 35 U.S.C. § 371, of International Application No. PCT/US2020/030993 filed May 1, 2020, which claims the benefit of U.S. Provisional Application No. 62/846,031, filed May 10, 2019, the contents of which are incorporated herein by reference.

BACKGROUND

Latency is generally referred to as the delay before a transfer of data begins following an instruction or request for transfer of the data. Lower latency uplink transmissions can be supported by a fast exchange of resource requests and/or responses between an access point (AP) and one or more stations (STAs). During a null data packet (NDP) feedback report procedure, an AP may transmit an NDP feedback report poll (NFRP) trigger, in which the AP may indicate that feedback type is a resource request. A starting association ID (AID) field may be included in the trigger frame sent by the AP. Next, an STA may receive and/or detect the NFRP trigger to determine if it is scheduled and how to transmit its NDP feedback report. The STA may obtain an NDP feedback report parameter from management frames. Upon receipt of data from the STA, an AP may not send an acknowledgement message to the STAs.

However, the NDP feedback report procedure may not be sufficient for certain low latency applications. For example, an AP may trigger a set of STAs with continuous AIDs, within an AID range, to transmit a resource request. However, a STA which is not in the AID range cannot be used to transmit a resource request or NDP feedback report. Further, a feedback status carried in the in the NDP feedback report may only signal the buffer size roughly in bytes. No latency or other quality of service (QoS) requirements may be included.

SUMMARY

Techniques, devices, and systems are disclosed for generating a resource request poll comprising at least one response criteria, transmitting the resource request poll, receiving a resource request report from each of at least one station (STA) of a plurality of associate STAs that meet at least one response criteria. Further, transmitting a trigger frame to the at least one STA based on the resource request report from the at least one STA is disclosed.

Transmitting the resource request poll, as disclosed, may include one of broadcasting and multicasting the resource request poll. The response criteria includes at least one of a null data packet (NDP) feedback report poll (NFRP) type, an uplink (UL) access type, a delay bound, an NDP feedback report access category (AC), a number of indicated AID bits, an AID range, an information requested, a number of bits to be included in NDP feedback report or preamble, number of long training fields (LTFs) to be included in the NDP feedback report or preamble, and a number of bits to be included in NDP feedback report or preamble per LTF or per N LTF symbol. The delay bound may include an amount of time and an AC may be selected from at least one of a Low Latency, a best effort (BK), a background (BC), a video (VI), and a voice (VO). At least one of the resource request poll and the trigger frame may be transmitted during a target wake up time (TWT). The resource request poll may include non-sequential STA AIDs. The resource request poll may include one of an element, a NDP feedback report parameter set element, and a short resource request poll. Additionally, an indication may be provided that a resource request report generated based on the resource request poll is transmitted as one of a random transmission and a deterministic transmission. Additionally, a collision based on two or more resource request reports from two or more STAs of the plurality of associated STAs may be detected.

Techniques, devices, and systems are disclosed for receiving a resource request poll comprising at least one response criteria, determining that a data stream meets the at least one response criteria, generating a resource request report based on the at least one response criteria, transmitting the resource request report to an AP, and receiving a trigger frame from the AP based on the resource request report.

Further, generating the resource request may include generating a preamble and N bits based on the response criteria. The response criteria may include at least one of a null data packet (NDP) feedback report poll (NFRP) type, an uplink (UL) access type, a delay bound, an NDP feedback report access category (AC), a number of indicated AID bits, an AID range, an information requested, a number of bits to be included in NDP feedback report or preamble, number of long training fields (LTFs) to be included in the NDP feedback report or preamble, and a number of bits to be included in NDP feedback report or preamble per LTF or per N LTF symbol. The resource request poll may include non-sequential STA AIDs and the resource request report may include one of an NFRP, a NDP feedback report parameter set element, and a short resource request poll. Additionally, generating the resource request report may include inserting an STA association ID (AID) into the resource request report.

A wireless transmit receive unit (WTRU) is disclosed and is configured to receive a resource request poll comprising at least one response criteria, determine that a data stream meets the at least one response criteria, generate a resource request report based on the at least one response criteria, transmit the resource request report to an AP, and receive a trigger frame from the AP. The WTRU may be configured to transmit a UL data transmission based on the trigger frame. The UL data transmission may include low latency data. The response criteria may include at least one of a null data packet (NDP) feedback report poll (NFRP) type, an uplink (UL) access type, a delay bound, an NDP feedback report access category (AC), a number of indicated AID bits, an AID range, an information requested, a number of bits to be included in NDP feedback report or preamble, number of long training fields (LTFs) to be included in the NDP feedback report or preamble, and a number of bits to be included in NDP feedback report or preamble per LTF or per N LTF symbol.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
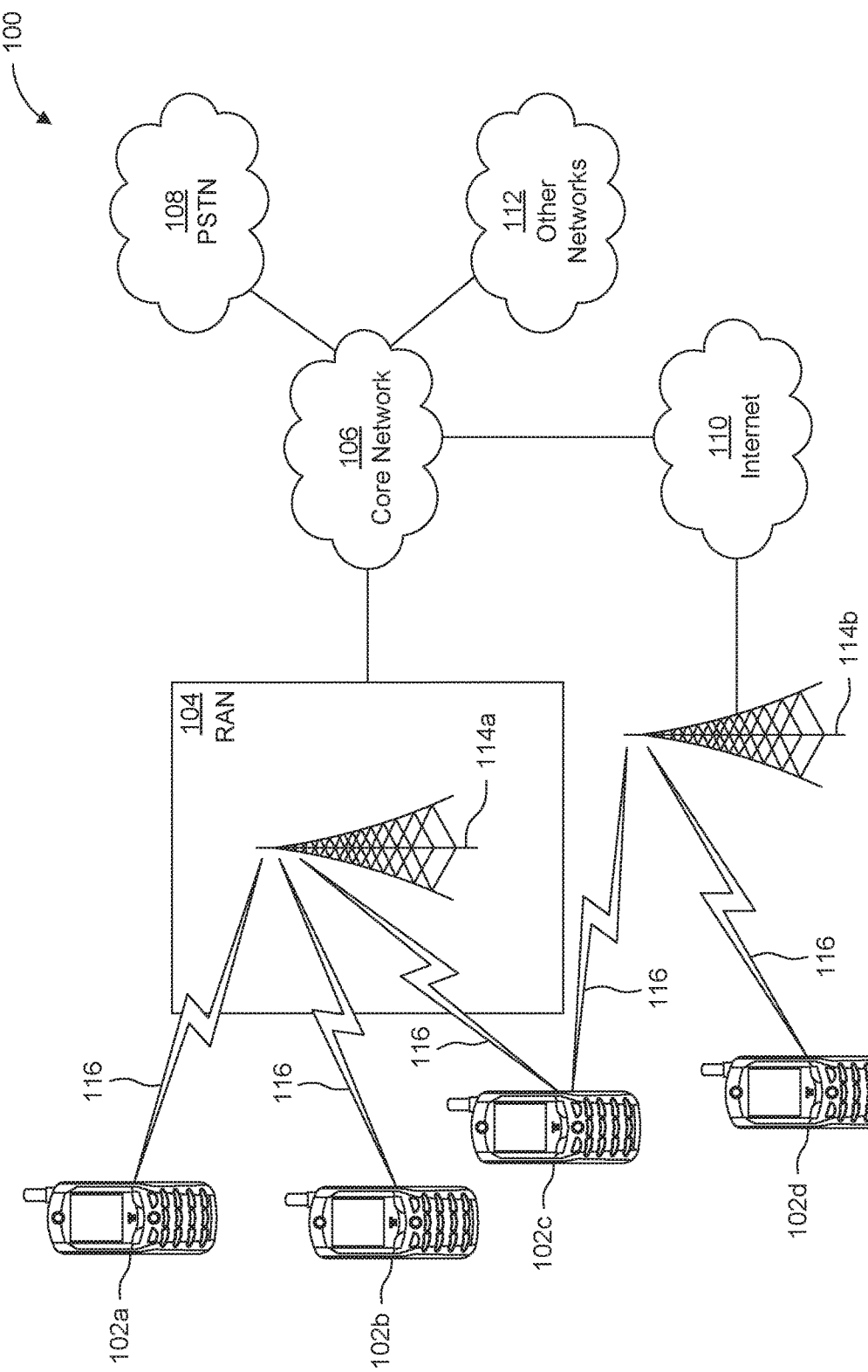
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
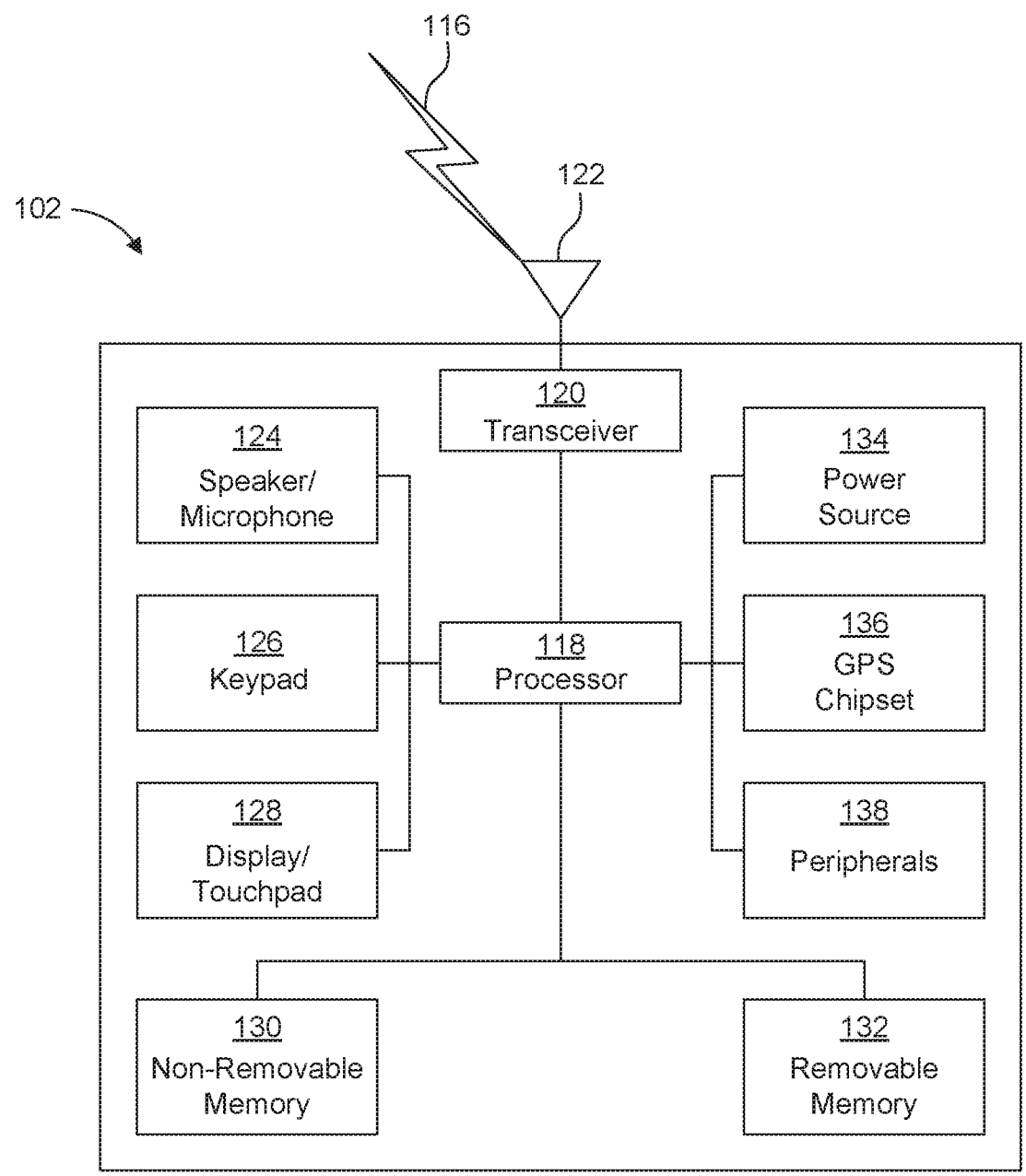
FIG. 1B is a system diagram illustrating an example wireless transmit/receive unit (WTRU) that may be used within the communications system illustrated in FIG. 1A according to an embodiment.
Figure 1C:
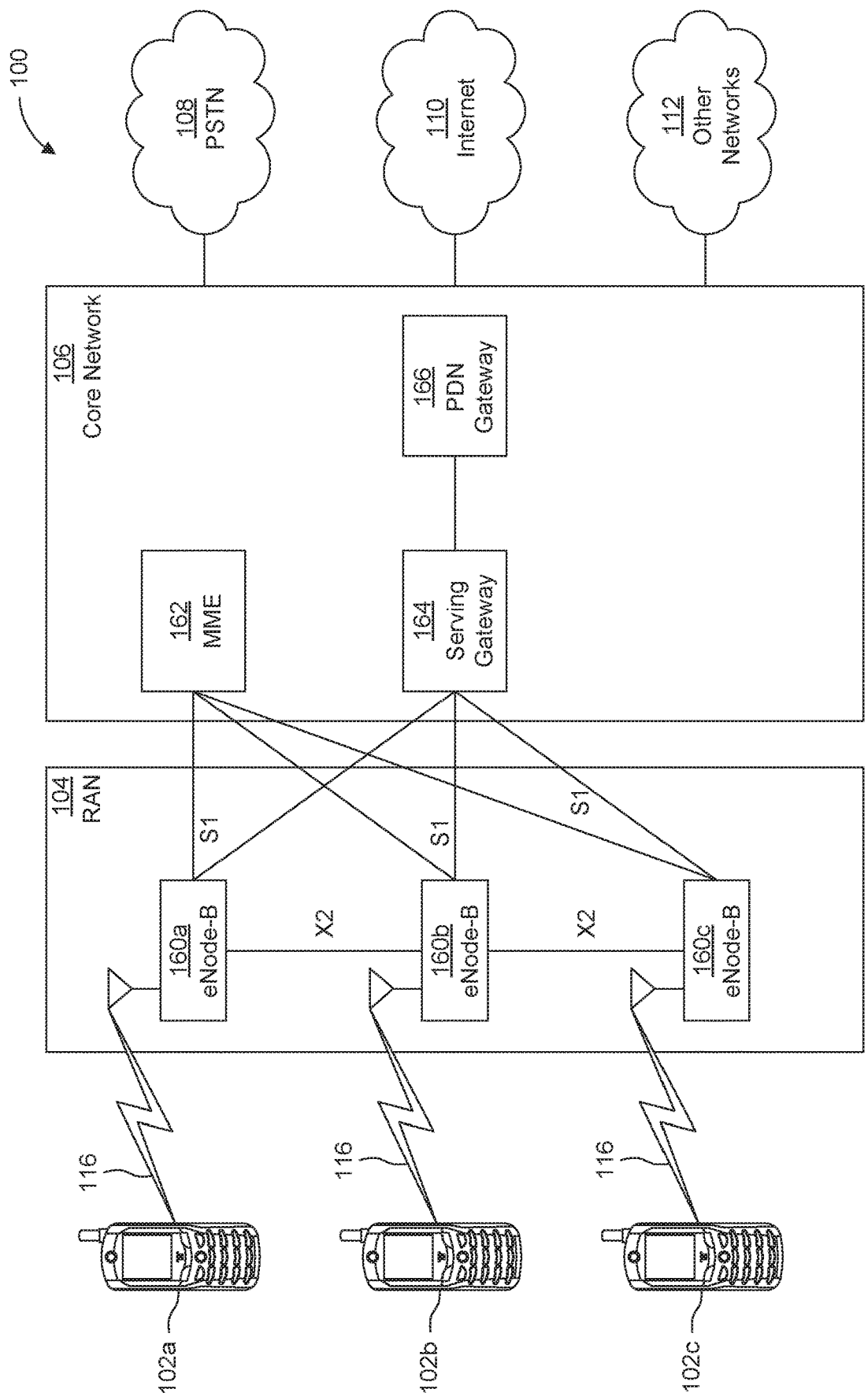
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
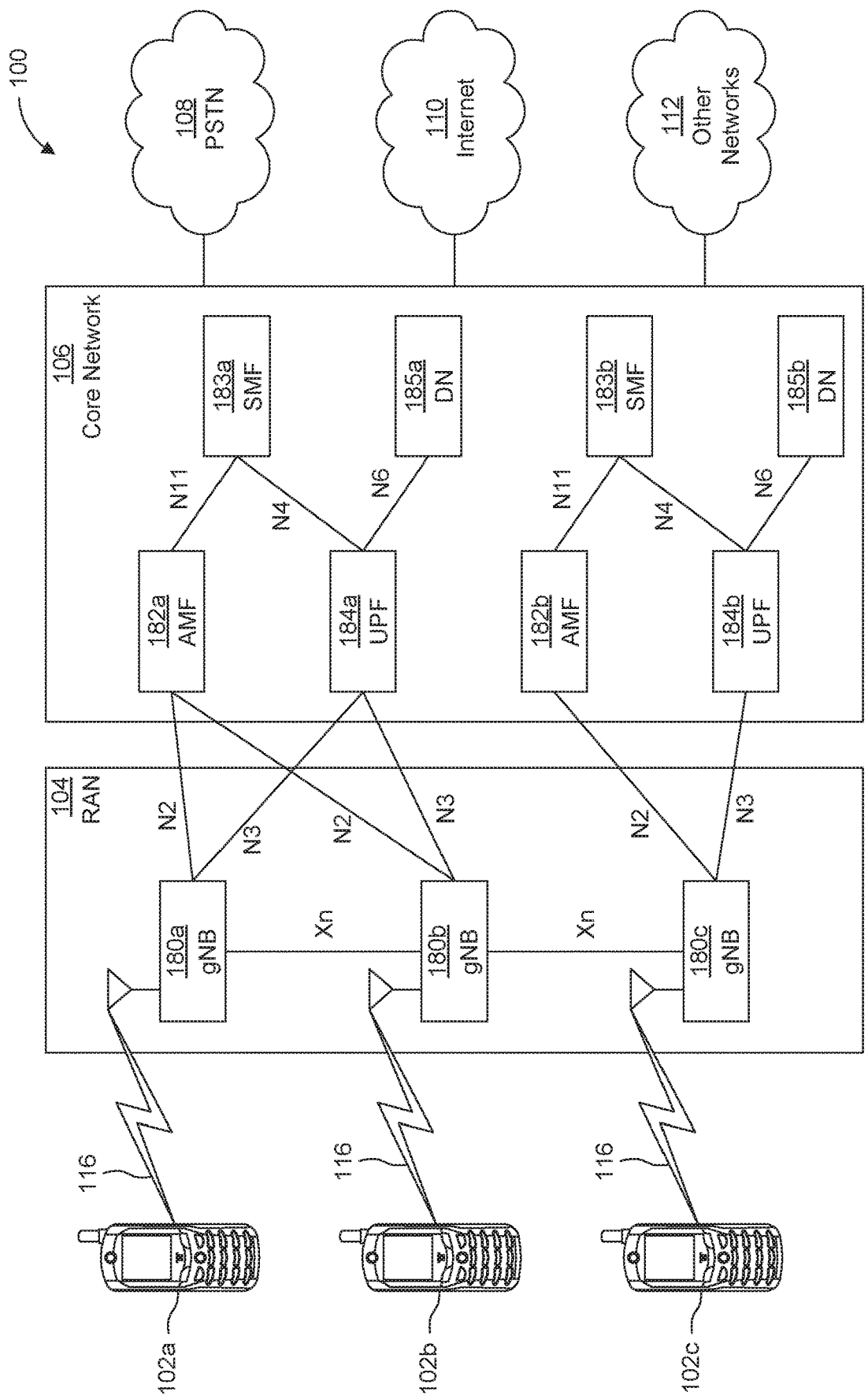
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Wireless transmissions that provide enhanced throughput, enhanced reliability, reduced latency and jitter, and improved power efficiency in many usage scenarios are disclosed herein. Applications that may be supported by such attributes include, but are not limited to, 4K/8K videos, gaming, virtual and augmented reality, remote office environments, cloud computing, etc. New generation WLAN devices may provide support to such applications that require very low latency as well as applications that require high throughput and high spectral efficiency. 4K/8K video, gaming, augmented reality, virtual reality, remote office environments, could computing, and the like are examples of applications of next generation WLAN which require low-latency communications.

Latency may be identified as a requirement since new, high-throughput, low latency applications, such as virtual reality, gaming, remote office, and cloud computing, will proliferate. Traffic growth for such and like applications continues to be driven by a significant growth in the video traffic and that IP video traffic. The throughput requirements of these and like application is in constant evolution with the emergency of 4K and 8K video, and new high-throughput applications such as virtual reality, gaming, remote office, and cloud computing. With the throughput and real-time requirements of these applications, WLAN users demand improved throughput and performance in delivering their applications in many environments.

5G NR networks may be designed to support three service categories: emBB, massive machine type communication (mMTC), and URLLC. Mechanisms and procedures designed for URLLC provide advanced services for latency sensitive devices or traffic. Configure grant transmission is adopted to reduce the frame exchanges of service request/response between gNB and WTRUs, so that WTRUs with low latency traffics are able to transmit them in pre-configured resources without requesting transmissions.

In WLAN, CSMA/CA channel access is used for multiple access. An STA can transmit without approval from its associated AP when the STA listens to the shared medium for a certain period and determines medium is free. The channel sensing resolution is typically 20 MHz or above.

In IEEE 802.11ax, OFDMA is adopted for both DL and UL transmission. Mechanisms and procedures are defined to enable one or more STAs to concurrently transmit in different frequency units. Normally, the concurrent UL OFDMA transmissions can be triggered and scheduled by the associated AP. Two schemes can be supported for low latency transmissions: UL OFDMA based Random Access (UORA) for associated and non-associated STAs; and Null Data Packet (NDP) feedback report procedure.

In IEEE 802.11ax, am STA can perform autonomous UL transmission using either traditional CSMA/CA procedure by sensing the entire channel or UORA. An AP may transmit a trigger frame with a set of resource units for associated STAs and/or unassociated STAs to transmit UL traffic. The AP may assign uplink MCS, length, and other related physical parameters. An STA may use a UORA procedure to determine the resource and transmit triggers based physical layer convergence protocol (PLOP) protocol data unit (PPDU). The AP transmits acknowledgement, such as multi-STA BA to the STAs. An example trigger frame format is shown in Table 1.

TABLE 1

| Frame Control | Duration | RA | TA | Common Info | User Info | ... | User Info | Padding | FCS |
|---|---|---|---|---|---|---|---|---|---|
| 2 | 2 | 6 | 6 | 8 or more | 5 or more | | 5 or more | v | 4 |

An example common information field is shown in Table 2.

TABLE 2

| Common Info | Trigger Type | UL Length | More TF | CS Required | UL BW | GI and LTF Type | MU-MIMO LTF Mode | # of HE-LTF Symbols and Midamble Periodicity |
|---|---|---|---|---|---|---|---|---|
| Bits | 4 | 12 | 1 | 1 | 2 | 2 | 1 | 3 |

| UL STBC | LDPC Extra Symbol Segment | AP TX Power | Pre-FEC Padding Factor | PE Disambiguity | UL Spatial Reuse | Doppler | UL HE SIG-A2 Reserved | Reserved | Trigger Dependent Common Info |
|---|---|---|---|---|---|---|---|---|---|
| 1 | 1 | 6 | 2 | 1 | 16 | 1 | 9 | 1 | v |

An example user information field in trigger frame, except for NFRP Trigger, is shown in Table 3.

TABLE 3

| User Info (not for NFRP) | AID12 | RU Allocation | UL FEC Coding | UL MCS | UL DCM | SS Allocation/ RA-RU Information | UL Target RSSI | Reserved | Trigger Dependent User Info |
|---|---|---|---|---|---|---|---|---|---|
| Bits | 12 | 8 | 1 | 4 | 1 | 6 | 7 | 1 | v |

In IEEE 802.11ax, an NDP feedback report procedure is supported. First, an AP may transmit a NDP Feedback Report Poll (NFRP) Trigger, in which the AP may indicate that feedback type is a resource request. A starting association ID (AID) field may be included in the trigger frame. Next, an STA may receive and/or detect the NFRP Trigger to determine if it is scheduled and how to transmit its NDP feedback report in response to the NFRP trigger. The STA may obtain an NDP feedback report parameter from management frames. The STA may follow the instructions in the NFRP Trigger and the NDP feedback report parameter to transmit the NDP feedback report. The NDP feedback report may be received by the AP. No acknowledge may be sent from the AP to the STAs. A trigger frame for NFRP may be in the frame format shown in Table 1.

A common information field for NFRP may be in the same format shown in Table 2.

An example user information field for NFRP is shown in Table 4.

TABLE 4

| User Info (NFRP) | Starting AID | Reserved | Feedback Type | Reserved | UL Target RSSI | Multiplexing Flag |
|---|---|---|---|---|---|---|
| Bits | 12 | 9 | 4 | 7 | 7 | 1 |

An STA triggered by an AP may respond with a trigger based PPDU. An example trigger based PPDU format is shown in Table 5.

TABLE 5

| L-STF | L-LTF | L-SIG | RL-SIG | HE-SIG-A | HE-STF | HE-LTF | ... | HE-LTF | Data | PE |
|---|---|---|---|---|---|---|---|---|---|---|

Transmissions in response to a UORA trigger may be transmitted with a single data stream.

Lower latency uplink transmissions can be supported by a fast exchange of resource requests and/or responses between an AP and one or more STAs. During a NDP feedback report procedure, an AP may transmit an NDP feedback report poll (NFRP) trigger, in which the AP may indicate that feedback type is a resource request. A starting association ID (AID) field may be included in the trigger frame sent by the AP. Next, an STA may receive and/or detect the NFRP trigger to determine if it is scheduled and how to transmit its NDP feedback report. The STA may obtain an NDP feedback report parameter from management frames. No acknowledge may be sent from the AP to the STAs.

However, the NDP feedback report procedure may not be sufficient for certain low latency applications. For example, an AP may trigger a set of STAs with continuous AIDs within an AID range, to transmit a resource request. However, a STA which is not in the AID range cannot be used to transmit a resource request or NDP feedback report. Further, a feedback status carried in the in the NDP feedback report may only signal the buffer size roughly in bytes. No latency or other quality of service (QoS) requirements may be included.

Figure 2:
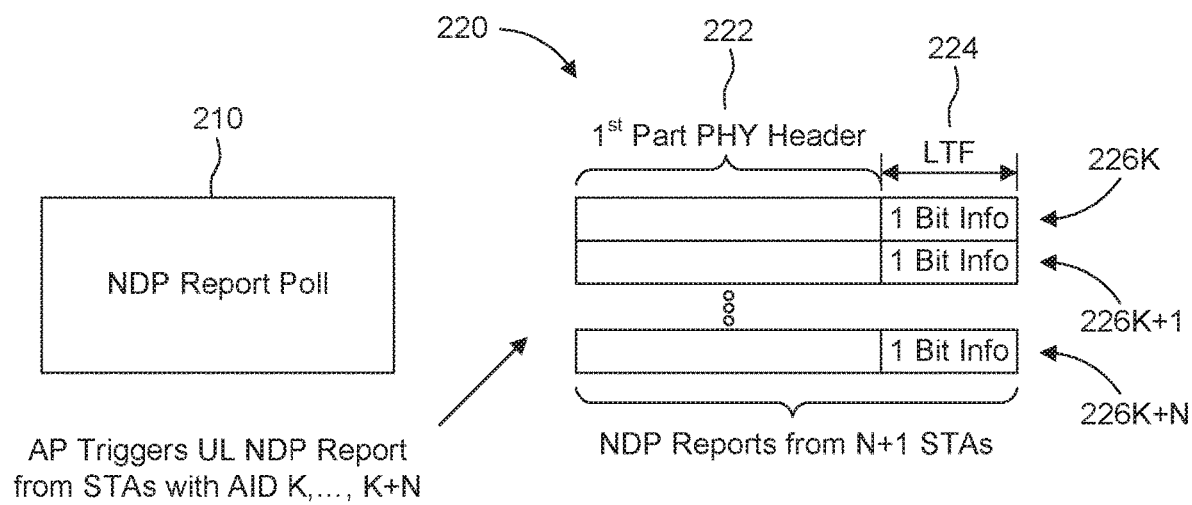
FIG. 2 shows an example null data packet (NDP) report procedure.

FIG. 2 shows an example NDP feedback report procedure as described herein. An AP may transmit a NDP Report Poll 210 to a plurality of STAs such that the NDP Report Poll 210 that triggers a UL NDP feedback report from STAs with AIDs K through K+N. NDP reports 220 from the N+1 STAs may be generated, as shown, and may include a first part 222 that comprises a PHY header and a second part 224 that comprises long training fields (LTFs) that can hold one bit of information. As shown, an NDP report is generated by each STA sequenced from 226K through 226K+N. Notably, in the example shown in FIG. 2, an NDP report from the N+1 STAs may only include the first part 222 that comprises the PHY header and only a single bit for LTF information. Accordingly, according to the NDP feedback report procedure, an entire sequential range of STAs (e.g., K through K+N) respond to an NDP report poll and, further, each STA provides one bit of data. The one bit of data may indicate whether buffered payload at the STA is either greater than or less than a threshold (e.g., a pre-determined threshold or a dynamically determined threshold). Accordingly, the NDP feedback report procedure may return sequential STA data and each STA may indicate whether a buffered payload is greater than or less than a given threshold.

Figure 3:
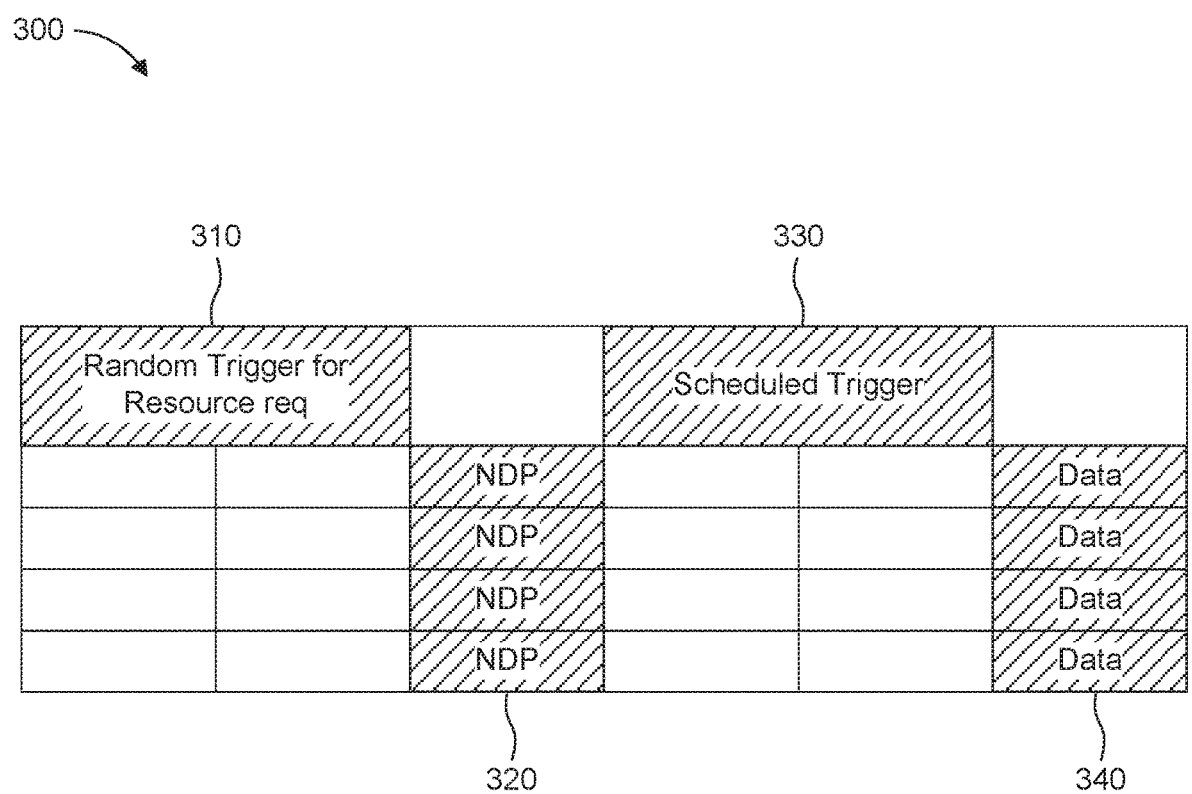
FIG. 3 method for low latency resource request indication and trigger based uplink transmissions.

According to embodiments of the disclosed subject matter, UL resource requests may be triggered for low latency traffic. FIG. 3 shows an example method for low latency resource request indication and trigger based uplink transmissions. As shown in FIG. 3, an AP may provide a random trigger to trigger resource request at 310 and may receive a number of NDP reports 320. The AP may transmit scheduled triggers at 330 based on the NDP reports for resource request at 320. The STAs may transmit data 340 based on the scheduled triggers 330.

An AP may transmit a resource request poll that solicits resource requests from STAs that are associated with the AP. For example, the AP may indicate, via the trigger frame, that it is soliciting compact resource requests, such as NDP feedback reports. The resource request poll may be an NFRP, a variation of an NFRP, or the like. The resource request poll (e.g., NFRP) may include one or more information types including, but not limited to, NFRP type, UL access type, delay bound, NDP feedback report AC, number of indicated AID bits, AID ranges, information requested, number of bits to be included in NDP feedback report or preamble, number of long training fields (LTFs) to be included in the NDP feedback report or preamble, and number of bits to be included in NDP feedback report or preamble per LTF or per N LTF symbol. One or more of the information types may be included in the reserved bits in the NFRP trigger frame. The one or more information types may generally be referred to as "response criteria" herein.

An NFRP type may indicate the type of the trigger of NFRP. For example, it may indicate that a given NFRP or trigger frame is triggering resource request for low latency traffic, or for all traffic.

A UL access type may indicate the type of UL access when STAs are triggered to transmit UL data or resource requests. The UL access type may be random or deterministic. If deterministic, an STA may follow the indicated AID range or order to transmit their UL data or resource request on the deterministic resource units (RUs) or subchannels. If random, the STAs may randomly choose an RU, following the indicated AID range, or order to transmit their UL data or resource request.

A delay bound may include information regarding a given delay bound associated with the resource request poll (e.g., NRFP). A delay bound may be, for example, an amount of time such that an STA may respond to a resource request poll if it requires a UL transmission within the amount of time of the delay bound. If an STA has traffic that needs to be transmitted to the AP before the given delay bound is expired, it may respond to the NFRP or trigger frame with a resource request. For example, the NFRP may include a delay bond of 20 ms such that STAs that require a UL transmission within the 20 ms respond to the NFRP and STAs that do not require a UL transmission within that time period may not respond to the NFRP. The delay bound may be specified as related to the time of transmission of the trigger frame or NFRP. Therefore, the UL traffic may be transmitted within the delay bound starting at the beginning or end of the NFRP or trigger frame that is being transmitted or related to the traffic specification. For example, the UL transmission may be transmitted within the delay bound specified counting from the time of generation or reception or from the time it has entered the queue.

An NDP feedback report access category (AC) includes access category restrictions for the solicited NDP feedback report or resource request. In embodiments, the AC values may be Low Latency, best effort (BK), background (BC), video (VI), and voice (VO). Low Latency AC may be ranked higher than VI and VO. A bit map may be used in an NFRP or trigger to indicate triggering of resource request for one or more ACs. If the NFRP or trigger frame triggering resource request is for a particular AC, the STA may indicate in the resource request all traffics for the ACs that is higher or equal to the indicated AC. In embodiments, the STA may indicate in the triggered resource request the traffic associated with the indicated AC. Additionally, the STA may use a bit map to indicate the presence or priorities for a plurality of ACs, as further disclosed herein under the information requested category. For example, a resource request in response to an NFRP or trigger may include four LTF bits, each corresponding to an AC (e.g., Low Latency, VO, VI, BC) such that the value for each bit in a resource request may indicate whether the given STA has a payload to transmit for the corresponding AC or to indicate a given property of the corresponding AC payload (e.g., priority).

A number of indicated AID bits indicates how many bits of the AID, such as the number of most significant bits (MSBs) or least significant bits (LSBs) of the AIDs, are indicated in the current trigger frame or NFRP frame. The number of bits of AID, such as MSBs, may be used to indicate the ranges of AIDs for which resource request is being triggered. For example, if 6 bits of MSBs or LSBs of AIDs are indicated in the trigger or NFRP frame, all STAs with AIDs that start with the 6 bits of MSBs or ends with the 6 bits of LSBs are to respond with resource request if they satisfy other requirements indicated by the trigger or NFRP frames.

AID ranges indicate one or more AID ranges of STAs that the NFRP or trigger frame is triggering the UL resource request. AID ranges may be in the form of a number of indicated MSBs or LSBs of AID bits and may be implemented by the combinations of STAs starting with given AID and/or a number of AIDs. Notably, a number or range of non-sequential STAs (i.e., with corresponding non-sequential STA AIDs) may be included via a given AID range or AID ranges such that non-sequential STAs transmit resource requests. Such non-sequential resource requests may allow greater flexibility than a single range of AIDs, as shown in FIG. 2.

Information requested indicates the feedback (e.g., ACs, priority, size, etc.) that the polled STAs may indicate in the triggered UL data transmission, resource request, or NDP feedback. The information may be indicated as a bitmap. For example, the information requested may be for one or more low latency traffic streams. The information requested may be for one or more ACs. Alternative or in addition, the information requested may be the queue size for one or more traffic streams, or ACs.

A number of bits to be included in NDP feedback report or preamble indicates the number of bits that should be included in the triggered NDP feedback report or triggered preambles or triggered UL transmissions. The number of bits may be contained or encoded in the legacy preambles, HE or EHT preambles, such as HE- or EHT-LTFs and HE- or EHT-STFs or other fields, the MAC header, the frame body, or the CRC or FCS fields.

The number of LTFs to be included in the triggered NDP feedback report or preamble may indicate the number of HE- or EHT-LTFs to be included in the NDP feedback report, preambles, or triggered resource requests. The number may indicate the number of LTFs or number of LTF pairs that the STA should transmit in the UL/resource request in response to a current trigger or NFRP frame.

The number of bits to be included in NDP feedback report or preamble per LTF, per 2, or per N LTF symbol may indicate the number of bits for an STA to include per HE- or EHT-LTFs, per 2, or per N HE- or EHT-LTFs when transmitting the triggered NDP feedback report or resource request. The number of bits may be implemented using less subcarriers for each bit per 1, 2, N HE or EHT-LTFs, or other fields.

According to embodiments of the disclosed subject matter, all or a subset of the information types described herein may be included in a NDP Feedback Report Parameter Set element or other type of element or frames transmitted by the AP. An NDP Feedback Report Parameter Set element or other type of element, frames transmitted by the AP, and/or a Short Resource Request poll, may be generally and collectively referred to as a "resource request poll". Additionally, a UL data transmission, resource request, NDP feedback report, a Short report (e.g., a UL Low Latency Short report), and/or Short Resource Request may generally and collectively be referred to as a "resource request report". As disclosed herein, a request poll may be transmitted by an AP and may be received by one or more STAs such that the resource request poll may trigger the one or more STAs to generate and transmit a resource request report.

Figure 4:
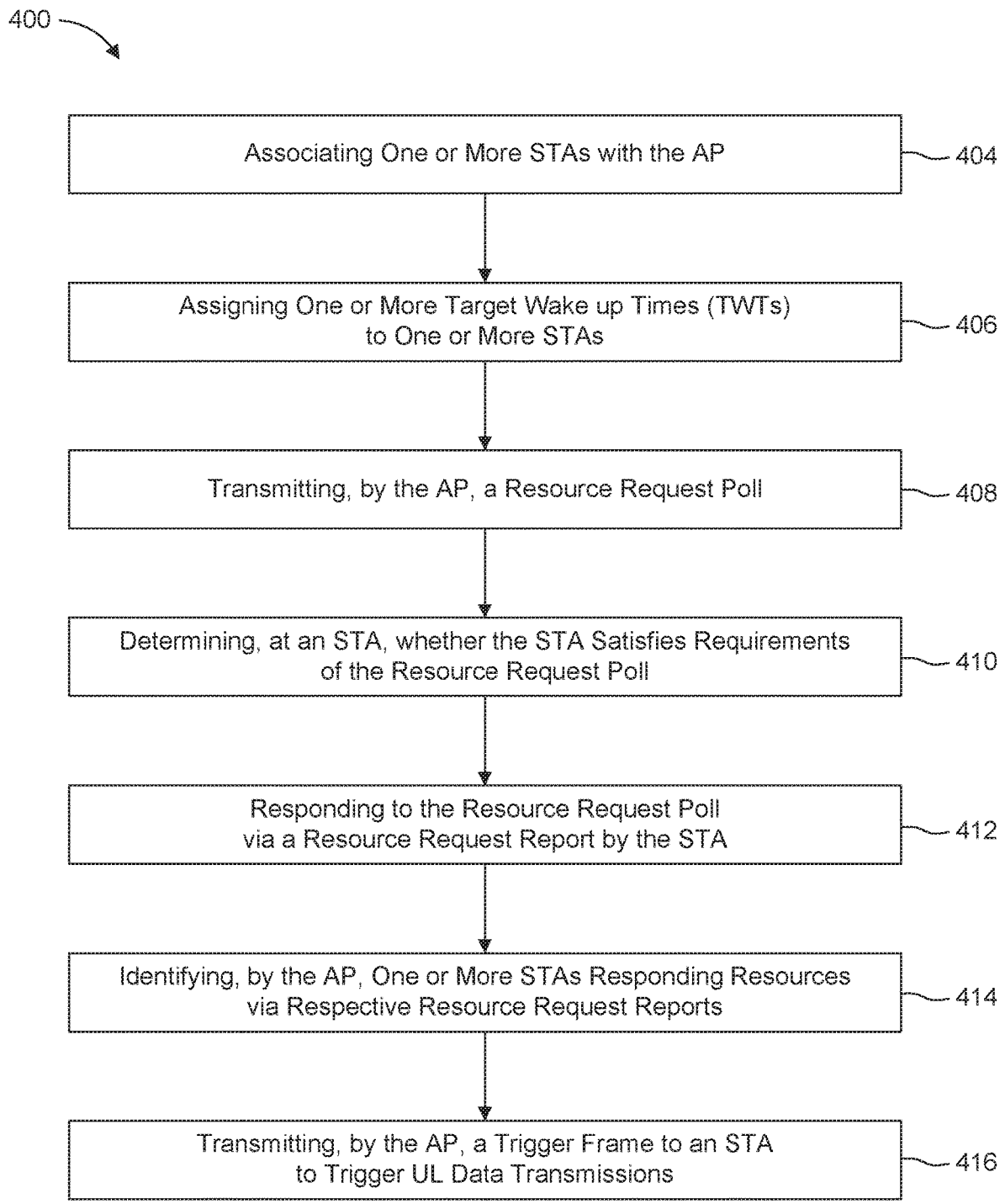
FIG. 4 shows a flowchart for implementing AP and STA based transmission procedures.

FIG. 4 shows an example process 400 for implementing AP and STA based transmission procedures. It will be understood that the steps provided in process 400 may not be performed in a sequential order and, further, one or more steps may not be performed to implement the embodiments disclosed herein. An AP may conduct association with one or more STAs and may provide one or more information types disclosed herein via an element such as an NDP Feedback Report Parameter Set element or other applicable element. The association process may be initiated by the one or more STAs. The AP may provide the one or more information types, via an element, during an association process with one or more STAs or in their respective beacon, short beacon, probe response frames, FILS Discovery frames, or association response frames.

At 404, an STAs may conduct the association process with the AP and may indicate that one or more of the STAs has low latency traffic, during the association process with the AP. The STA may also indicate AP that it has low latency traffic or one or more low latency data streams using a traffic specification (TSPEC) or a low latency request frame.

At 406, an STA may be assigned one or more target wake up times (TWT). For example, the STA may be assigned a broadcast TWT or service periods in which it is polled for UL low latency data transmission or UL low latency resource request. It will be understood that any part of process 400, such as 406 is optional such that the process 400 may be implemented without performing 406 or 406 may be performed in an alternative order than the order provided herein.

At 408, at any given time or at a previously agreed service period, such as a broadcast or individual TWT service period, the AP may poll the one or more STAs via a resource request poll. The resource request pool may indicate response criteria and one or more STA's IDs. For example, the AP may include one or more AID ranges in a trigger frame or in NFRP frames.

To indicate a particular AID range, the AP may indicate a starting AID, as well as a number of AIDs to indicate a particular range of AIDs. Alternatively, the AP may indicate the number of AID bits used in the trigger or NFRP frame to indicate a range. For example, the trigger frame or NFRP may include an indication of a number N of MSBs or LSBs of an AID range. Accordingly, the AID range would correspond to all STAs with AIDs that contained the N MSBs or LSBs.

As noted, at 408 the AP may send a frame (e.g., resource request poll, trigger frame or NFRP frame to poll STAs for UL resource request). The resource request poll to poll STAs may be sent at any given time period or at a previously agreed service period, such as a broadcast or individual TWT service period. Further, AP may indicate the information type required in response to the resource request poll such as a particular type of traffic being polled, such as low latency traffic, or one or more particular ACs, such as low latency, low latency VR, low latency AR, low latency gaming, BK, BE, VO and VI.

Additionally, at 408, the AP resource request poll's response criteria may specify the delay bound for traffic being polled, such as frames that need to be transmitted within the indicated delay bound. A resource request poll with a specific delay bound may be interpreted as a poll requesting all traffic that needs to be transmitted within the delay bound. For example, if the delay bound is 10 ms, the traffic being polled may include a VO frame that was generated 44 ms before the poll is received at the FTA, and needs to be transmitted within a 50 ms delay bound from generation. Accordingly, the VO frame satisfies the 10 ms delay bound requirement as it needs to be transmitted within Ems from receipt of the poll. As another example, traffic qualifying for the 10 ms delay bound requirement may also include low latency traffic that was generated 4 ms before the poll is received, and is to be transmitted to the AP with a 10 ms delay from generation. According to an embodiment, a resource request poll with the indicated delay bound may be interpreted as including traffic to be delivered within a delay bound that is lower or equal to the specific indicated delay bound since the generation of the given traffic. An STA being polled (e.g., whose AID is indicated in the trigger frame or NFRP) may respond, if it satisfies other requirements, such as if the STA has traffic or traffic streams that satisfy the delay bound requirement by transmitting a NDP feedback report or a UL resource request or data.

Additionally, at 408, the AP may indicate that the resource request report or specifically a UL transmission be transmitted randomly or deterministically. If the resource request report or UL transmission is to be transmitted deterministically, resources may be allocated for each of the AID ranges provided by the AP at 412. Further resources may be allocated for each of the AID ranges while indicating multiplexing by using P matrices or other methods for each of the AID ranges associated with a given resource allocation. If the resource request report or UL transmission are to be transmitted randomly, resources may be allocated for each of the AID ranges. Additionally or alternatively, the trigger frame or NFRP may also contain the number of bits N that the responding STAs may include in the UL data transmission or resource request. The responding STAs may include the number of bits as indicated in the trigger frame or NFRP, which may be N bits of MSB or LSB of an STA's AID (i.e., to indicate their identity), such as in the number of LTFs or number of pair of LTFs fields to be included. For example, a AP may indicate an AID range by indicating 6 MSBs of the AID range to poll all STAs whose AIDs contain the 6 MSBs in their AIDs. The AP may also indicate that the STA should include 5 LSBs in their responding data transmission or resource request frames, e.g., NDP feedback report. The responding STAs may include the number of HE- or EHT-LTFs in the resource request or NDP feedback report, which may be 5 or 10 HE- or EHT-LTFs. The 5 or 10 HE- or EHT-LTFs may include the 5 LSBs of its AID in the UL transmitted data transmission or resource request of NDP feedback report. The resource request report may be transmitted randomly over the resource allocated for the corresponding AID range.

At 410, an STA may determine whether it is polled by the AP. An STA may determine whether it is polled based on, for example, if its AID is included in one or more of the AID ranges, as indicated by the AP in the trigger frame or NFRP.

Additionally, the STA being polled (e.g., an STA with an AID that was indicated in the trigger frame or NFRP) may respond via a resource request report, at 412, if it satisfies other requirements of the received resource request poll, such as if the STA has low latency or the right type of low latency traffic, or traffic of the indicated AC by transmitting an NDP feedback report or a UL resource request or data. Additionally or alternatively, an STA being polled may respond if it satisfies other requirements, such as if the STA has low latency or the right type of low latency traffic, or traffic of the indicated AC, or higher, that is above a certain threshold which may be indicated by the NDP Feedback Report Parameter Set element by transmitting a NDP feedback report or a UL resource request or data.

At 414, an AP may identify which one or more STAs, of a plurality of STAs, have requested resources by examining the N bits included in the respective resource request reports (e.g., UL data transmission, resource request, or NDP feedback report). The AP may identify the AID of the requesting STA and, at 416, subsequently transmit a trigger frame to the STA to trigger UL data transmissions. If two STAs have chosen the same resource or RU for uplink transmissions of resource request or NDP feedback report, the AP may detect collision. The AP may allocate a number of random access RU or resources to trigger subsequent data transmission using one or more AID ranges, for an RU index at which the collision occurred for UL resource request to accommodate the STAs that collided, when transmitting the UL resource request. The process 400 of FIG. 4 may enable an AP to access information corresponding to the current transmission requirements of associated STAs.

According to an embodiment, an AP may indicate information requested from the STAs, such as bitmap for one or more low latency data streams, for one or more access categories, or for one or more type of low latency data or other type of data, as disclosed herein. The AP may request that the STAs provide more detailed size information regarding the information requested, such as sizes of queues and/or low latency data or other type of data or access categories. The AP may indicate how many bits that a polled STA may include in the responding or triggered data transmission, resource request, or NDP feedback report. Such information may be included in the Number of Bits to be included field, Number of LTFs, or Number of Pair of LTFs to be included information. An STA that is polled may include the number of bits, number of LTFs, or number of pair of LTFs in the NDP feedback report or in the resource request that is being triggered. Each bit may correspond to each bit in the bitmap for information requested. Additionally or alternatively, the STAs that are polled may transmit the triggered resource request or NDP report and may use the number of bits as indicated by the AP to indicate the size of queues of data streams or low latency traffics. As noted herein, it will be understood that any part of process 400, such as 416 is optional such that the process 400 may be implemented without performing 416 or 416 may be performed in an alternative order than the order provided herein.

Figure 5:
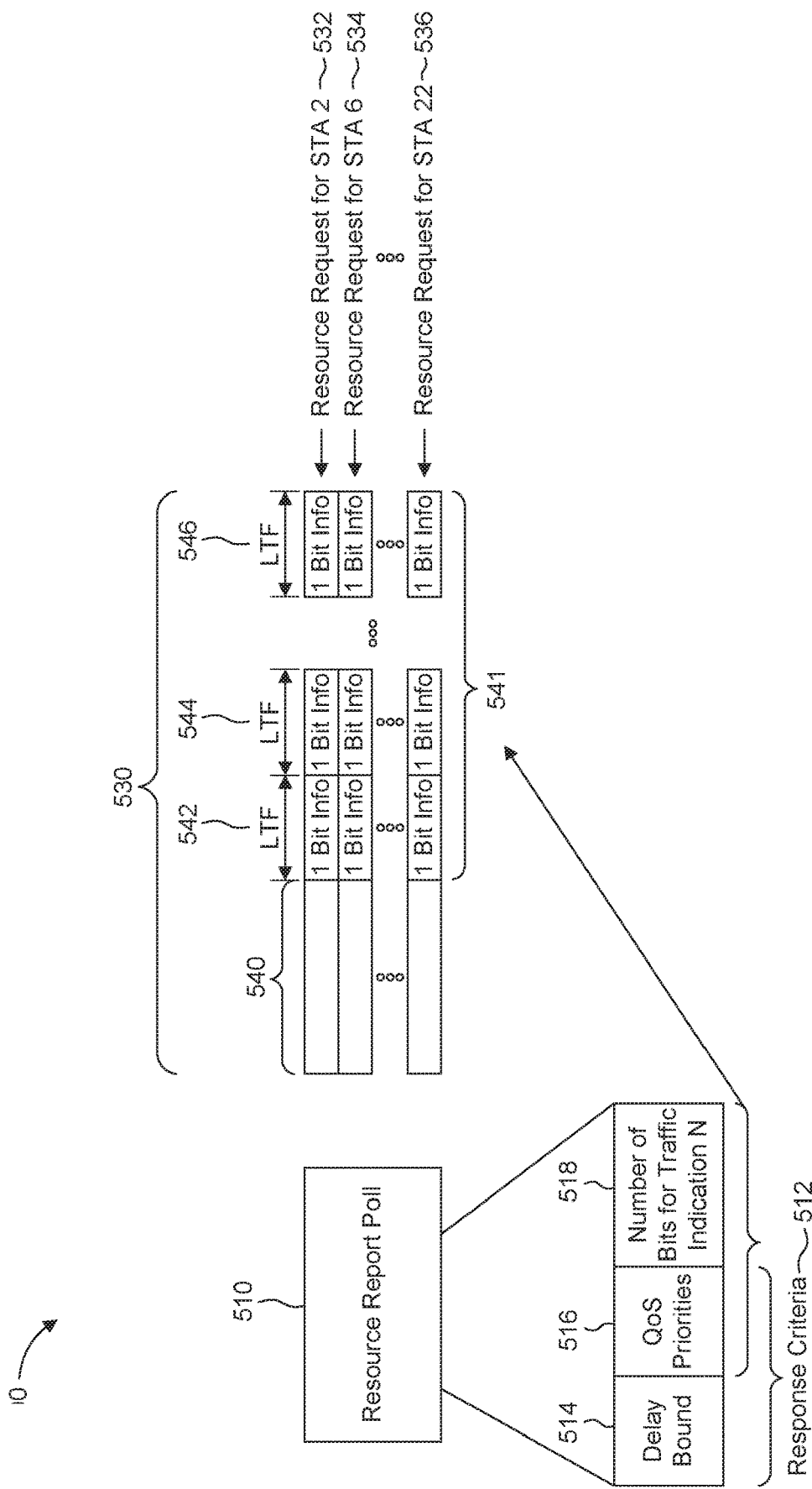
FIG. 5 shows a diagram of a resource request poll and a resource request report.

FIG. 5 shows a diagram showing a resource request procedure 500 and includes a resource request poll 510 and resource request report 530, as disclosed herein. As shown in FIG. 5, a resource request poll 510 may be generated by an AP and may be transmitted (e.g., via broadcast or multicast) to one or more STAs. The resource request poll 510 may be a NDP Feedback Report Parameter Set element or other type of element or frame. As disclosed herein, an AP may be associated with one or more STAs (e.g., during a beacon period). The resource request poll 510 may be generated at the AP and transmitted to and/or received by one or more associated STAs.

As shown in FIG. 5, the resource request poll 510 may include response criteria 512 which includes a delay bound 514 and QoS priorities 516. It will be understood that the low latency criteria 512 may include one or more other or alternative information types including, but not limited to, NFRP type, UL access type, NDP feedback report AC, number of indicated AID bits, AID ranges, information requested, or the like. Additionally, it will be understood that the response criteria 512 may correspond to low latency response criteria such that STAs that meet the response criteria 512 may have low latency data to transmit. Additionally, the resource request poll 510 may include a Number of Bits field 518 for traffic indication N. The number of bits field 518 may include a number of bits to be included in a requested resource report such as an NDP feedback report or preamble, number of long training fields (LTFs) to be included in the NDP feedback report or preamble, and number of bits to be included in NDP feedback report or preamble per LTF or per N LTF symbol, a bitmap of AC based priority data, or the like.

The resource request poll 510 may be transmitted by the AP and received by one or more STAs. The one or more STAs may each determine if they meet the response criteria 512. STAs that meet the response criteria 512 may each generate a resource request report (e.g., resource request report 532, 534, and 536) as shown by the set of generated resource request reports 530. The generated resource requests reports 530 may each include a first part PHY header 540 and a number of N bits 541, as provided in the corresponding resource request poll 510. The N bits 541 may each include 1 bit of data that corresponds to, for example, a detailed indication of size for the data to be transmitted by a respective STA to the AP or to provide a bitmap for request of more than 1 traffic priorities (e.g., VO, VI, BC, BK). As examples of information provided by the N bits 541, each of a number of bits in the N bits 541 may be used to indicate different priorities for different AC (e.g., VO, VI, BC, BK). Alternatively, for example, a plurality of the N bits 541 may be used to indicate how much of a given priority AC that the STA is to transmit. Alternatively, for example, some of the N bits 541 may be used to provide STA identification information.

The AP may receive the resource request reports 530 from each STA that meets the response criteria 512. Based on the resource request reports 530, the AP may determine a priority order to trigger UL data transmissions from the STAs that transmitted the resource request reports 530.

Notably, based on the techniques disclosed herein, an AP may poll a number of STAs that may not be sequential such as APs having different ranges. As an example, FIG. 5 shows a resource request report 532 for STA 2 followed by resource request report 536 for STA 6 (i.e., STA 2 and STA 6 do not have sequential AIDs). Additionally, STAs may provide detailed information based on the AP's resource request poll 510's number of bits 518 indication, as disclosed herein.

According to an embodiment, an AP may maintain a separate low latency ID bitmap for STAs that currently have low latency traffic. An AP may advertise that it supports low latency transmissions by including a low latency element in its beacon, short beacon, FILS Discovery frames, probe response, or association response frames. The low latency element may include an indication that it supports low latency bitmaps. When an STA seeking association with an AP has low latency traffic or low latency traffic streams, it may also include a low latency element in its probe request or association request frames. The STA may include an indication of support of low latency ID bitmap in the low latency element. If an STA that is already associated with an AP starts a low latency traffic stream, it may send a low latency request frame which may include the low latency element to request a low latency ID. The AP may assign a low latency ID to the STA in response to the low latency request frame or associated response frame. For example, the AP may include a low latency assignment element in the association response frame or in the low latency response frame which may include a low latency ID and/or TWT information.

A low latency ID may be an ID that is assigned to an STA. Alternatively or in addition, the AP may assign a low latency ID to each low latency data stream indicated by the STA. Alternatively or in addition, the AP may allocate a separate section of the AID space to the low latency IDs or low latency IDs for certain type of application(s), such as virtual reality. Each of the separate sections may be identified by a common number of bits of MSBs or LSBs of the AID space. For example, a low latency ID range may be identified as a range of AIDs that all start with the same 6 bits of MSBs. An AP may assign an individual low latency ID for each of the low latency traffic streams.

Low latency data streams may be polled for UL transmission or resource request during one or more TWT periods. Alternatively or in addition, one or more TWT elements may be included in the association response frame or in the low latency response frame. Additionally or alternatively, the AP may use low latency broadcast TWTs to trigger low latency STAs, low latency data stream transmissions, or low latency resource requests.

When an STA is assigned one or more low latency IDS and/or one or more low latency TWTs, the AP may transmit low latency triggers to trigger low latency STAs, low latency transmissions, or low latency resource request in the UL. The AP may indicate the ACs or indicate low latency in such trigger or NFRP frames. If the AP indicates low latency in such trigger or NFRP frames, it may include a low latency ID bitmap in the trigger or NFRP frames. Additionally or alternatively, it may include a range or a number of ranges of low latency IDs which are being polled. If low latency IDs are associated with a particular range of AIDs, transmitting a NFRP, trigger for data, or resource request may imply that the trigger or NFRP is for low latency traffic.

Additionally, when an STA is assigned one or more low latency IDs and/or one or more low latency TWTs, the STA may monitor the medium for the low latency TWTs or low latency transmission opportunity (TXOPs) that are assigned to itself for any UL trigger frames or NFRP frames that are addressed to itself or addressed to broadcast addresses or group addresses. It may monitor the low latency IDs that are contained in the NFRP or trigger frame. If it detects that one or more low latency IDs or AIDs that are assigned to itself it may respond if it satisfies other requirements, such as if the STA has low latency or the right type of low latency traffic, or traffic of the indicated AC by transmitting a NDP feedback report or a UL resource request or data.

An STA may send another Low Latency Request frame or other type of frames if one or more of its Low Latency traffic or traffic streams has stopped. The Low latency Request frame may include a Low Latency element to indicate that one or more its Low Latency traffic streams have stopped. The Low Latency Request frame or other type of frames may be used to request that the Low Latency ID associated with the STA or one or more Low Latency Traffic Type of Low latency Traffic streams to be removed. The AP may respond with a Low Latency Response frame or other type of frames to acknowledge the removal of the Low Latency ID, and/or to confirm one or more Low latency ID that is still assigned to the STA or associated with one or more Low Latency Traffic types or streams.

As disclosed herein, AIDs and low latency IDs are used as examples. However, any IDs of STAs may be used to indicate an STA, including MAC addresses or other types of IDs that the AP and STA have agreed to or otherwise confirmed.

Although the disclosed subject matter may consider a given specific protocol (e.g., IEEE 802.11), the embodiments disclosed herein are not restricted to such a specific protocols, and are applicable to other wireless systems.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for wireless communication performed by a station (STA), the method comprising:
   receiving, from an access point (AP), a resource request poll indicating one or more requirements for low latency traffic and a number of bits that may be included in an uplink (UL) resource request report;
   transmitting, to the AP, upon a determination that a data stream meets the indicated one or more requirements for low latency traffic, an UL resource request report, wherein the UL resource request report includes information within the indicated number of bits, wherein the information indicates at least one of: an amount of data of the data stream that is to be transmitted, priority information associated with the data stream, or a bitmap associating the UL resource request report with a plurality of traffic priorities; and
   receiving, from the AP, a trigger frame in response to the UL resource request report.

2. The method of claim 1, further comprising send, to the AP, a transmission in response to the received trigger frame.

3. The method of claim 1, wherein the priority information associated with the data stream indicates at least one Quality of Service (QOS) requirement.

4. The method of claim 1, wherein the one or more requirements for low latency traffic comprises at least one of a null data packet (NDP) feedback report poll (NFRP) type, a UL access type, a delay bound, an NDP feedback report access category (AC), a number of indicated AID bits, an AID range, an information requested, or a number of long training fields (LTFs) to be included in the NDP feedback report or preamble.

5. The method of claim 1, wherein the resource request poll comprises non-sequential AIDs associated with a plurality of STAs.

6. The method of claim 1, wherein the UL resource request report comprises at least one of an NFRP, an NDP feedback report parameter set element, or a short resource request poll.

7. A station (STA) comprising:
a processor; and
a transceiver;
the transceiver configured to receive, from an access point (AP), a resource request poll indicating one or more requirements for low latency traffic and a number of bits that may be included in an uplink (UL) resource request report;
the processor and the transceiver configured to transmit, to the AP, upon a determination that a data stream meets the indicated one or more requirements for low latency traffic, an UL resource request report, wherein the UL resource request report includes information within the indicated number of bits, wherein the information indicates at least one of: an amount of data of the data stream that is to be transmitted, priority information associated with the data stream, or a bitmap associating the UL resource request report with a plurality of traffic priorities; and
the transceiver configured to receive, from the AP, a trigger frame in response to the UL resource request report.

8. The STA of claim 7, the transmitter further configured to send, to the AP, a transmission in response to the received trigger frame.

9. The STA of claim 7, wherein the priority information associated with the data stream indicates at least one Quality of Service (QOS) requirement.

10. The STA of claim 7, wherein the one or more requirements for low latency traffic comprises at least one of a null data packet (NDP) feedback report poll (NFRP) type, a UL access type, a delay bound, an NDP feedback report access category (AC), a number of indicated AID bits, an AID range, an information requested, or a number of long training fields (LTFs) to be included in the NDP feedback report or preamble.

11. The STA of claim 7, wherein the resource request poll comprises non-sequential AIDs associated with a plurality of STAs.

12. The STA of claim 7, wherein the UL resource request report comprises at least one of an NFRP, an NDP feedback report parameter set element, or a short resource request poll.

13. The STA of claim 7, wherein the UL resource request report includes an association ID (AID) associated with the STA.

14. An access point (AP) comprising:
a processor; and
a transceiver;
the transceiver configured to transmit a resource request poll indicating one or more requirements for low latency traffic and a number of bits that may be included in an uplink (UL) resource request report;
the transceiver further configured to receive, from at least one station (STA), at least one UL resource request report, wherein the at least one UL resource request report includes information within the indicated number of bits, wherein the information indicates at least one of: an amount of data of the data stream that is to be transmitted, priority information associated with the data stream, or a bitmap associating the at least one UL resource request report with a plurality of traffic priorities; and
the transceiver configured to transmit to one or more of the at least one STAs, a trigger frame in response to the at least one UL resource request report.

15. The AP of claim 14, wherein the transceiver is configured to receive at least one transmission in response to the transmitted trigger frame.

16. The AP of claim 14, wherein the priority information associated with the data stream indicates at least one Quality of Service (QOS) requirement.

17. The AP of claim 14, wherein the one or more requirements for low latency traffic comprises at least one of a null data packet (NDP) feedback report poll (NFRP) type, a UL access type, a delay bound, an NDP feedback report access category (AC), a number of indicated AID bits, an AID range, an information requested, or a number of long training fields (LTFs) to be included in the NDP feedback report or preamble.

18. The AP of claim 14, wherein the resource request poll comprises non-sequential AIDs associated with a plurality of STAs.

19. The AP of claim 14, wherein the UL resource request report comprises at least one of an NFRP, an NDP feedback report parameter set element, or a short resource request poll.

20. The AP of claim 14, wherein the UL resource request report includes at least one association ID (AID) associated with the at least one STA.

* * * * *